(12) United States Patent
Kaplan et al.

(10) Patent No.: US 10,083,182 B2
(45) Date of Patent: Sep. 25, 2018

(54) AUGMENTED DIRECTORY HASH FOR EFFICIENT FILE SYSTEM OPERATIONS AND DATA MANAGEMENT

(71) Applicant: International Business Machines Corporation, Armonk, NY (US)

(72) Inventors: Marc A. Kaplan, Bethel, CT (US); Wayne A. Sawdon, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 327 days.

(21) Appl. No.: 14/316,098

(22) Filed: Jun. 26, 2014

(65) Prior Publication Data

US 2015/0379032 A1    Dec. 31, 2015

(51) Int. Cl.
*G06F 17/30* (2006.01)
*G06F 9/46* (2006.01)

(52) U.S. Cl.
CPC ........ *G06F 17/30097* (2013.01); *G06F 9/465* (2013.01)

(58) Field of Classification Search
None
See application file for complete search history.

(56) References Cited

U.S. PATENT DOCUMENTS

| | | | | |
|---|---|---|---|---|
| 4,215,402 A | * | 7/1980 | Mitchell | ........... G06F 17/30949 707/E17.036 |
| 8,484,258 B2 | | 7/2013 | Anderson, Sr. et al. | |
| 8,766,827 B1 | * | 7/2014 | Milne | ................. H03M 7/3084 341/51 |
| 8,788,263 B1 | * | 7/2014 | Richfield | .......... G06F 17/30864 704/9 |
| 2005/0165881 A1 | | 7/2005 | Brooks et al. | |
| 2007/0198609 A1 | * | 8/2007 | Black | .................. G06Q 10/087 |
| 2011/0295910 A1 | * | 12/2011 | Ziemann | ........... G06F 17/30292 707/803 |
| 2012/0066222 A1 | | 3/2012 | Nguyen | |
| 2012/0284463 A1 | * | 11/2012 | Srinivasan | .............. G06F 9/383 711/141 |
| 2015/0032695 A1 | * | 1/2015 | Tran | .................. G06F 17/30578 707/625 |

OTHER PUBLICATIONS

Krithi Ramamritham; Scheduling Algorithms and Operating Systems Support for Real-Time Systems; 1994; IEEE; pp. 1-13.*

(Continued)

*Primary Examiner* — Mariela Reyes
*Assistant Examiner* — Jermaine Mincey
(74) *Attorney, Agent, or Firm* — Cantor Colburn LLP; Bryan W Butler (57) ABSTRACT

Embodiments relate to scheduling operations to perform on objects. A method for scheduling operations to perform on objects is provided. The method identifies a plurality of operations to perform on a plurality of objects each having at least one attribute. At least one of the operations has scheduling dependency on another operation. The method generates a numeric value for each of the objects from the attribute of the object. The method schedules the operations to perform on the objects based on the numeric values of the objects and the scheduling dependency.

15 Claims, 3 Drawing Sheets

(56) References Cited

OTHER PUBLICATIONS

IBM et al.; "Encoding/Decoding Scheme to Provide CD-ROM Filesystem Support to Distributed Computing Environment Distributed File Services"; IP.com; Mar. 31, 2005; pp. 119-120.

IBM et al.; "Improved Access for Sequentially Numbered Files in a Hashing File System"; IP.com; Mar. 27, 2005; pp. 1-4.

Grace Period Disclosure—"Advanced Administration Guide"; General Parallel File System, Version 3, Release 5.0.11; SC23-5182-08; Jun. 28, 2013; 288 pages.

\* cited by examiner

AUGMENTED DIRECTORY HASH FOR EFFICIENT FILE SYSTEM OPERATIONS AND DATA MANAGEMENT

STATEMENT REGARDING PRIOR DISCLOSURES BY THE INVENTOR OR A JOINT INVENTOR

The following disclosure(s) are submitted under 35 U.S.C. 102(b)(1)(A): "Advanced Administration Guide," General Parallel File System, Version 3 Release 5.0.11, SC23-5182-08, Jun. 28, 2013 p. 26.

BACKGROUND

The present invention relates generally to file system operations, and more specifically, to hashing file attributes to facilitate efficient performance of file system operations.

Most file systems provide a directory or folder structure to organize the files. In a directory structure, finding a file involves looking at the root directory and then traversing sub-directories until the desired file is located. In a like manner, computer utilities that operate on files, such as a find utility, a tar utility, and a rsync utility, begin processing at the root directory and operate on the files in a certain predefined order such as a top-down order, a bottom-up order, a breadth-first order or a depth-first order. The order creates dependencies between the operations. For example, a recursive copy creates the parent directories before copying the files into the parent's child directories. Likewise, to delete a parent directory, all of the child directories of the parent directory should be deleted before the parent directory is deleted. The operations, therefore, should be scheduled in an order that resolves the dependencies.

SUMMARY

Embodiments include a computer program product, a method, and a system for scheduling operations to perform on objects. According to an embodiment of the present invention, a computer program product for scheduling operations to perform on objects is provided. The computer program product comprises a computer readable storage medium having program instructions embodied therewith. The program instructions readable by a processing circuit cause the processing circuit to perform a method. The method identifies a plurality of operations to perform on a plurality of objects each having at least one attribute. At least one of the operations has scheduling dependency on another operation. The method generates a numeric value for each of the objects from the at least one attribute of the object. The method schedules the operations to perform on the objects based on the numeric values of the objects and the scheduling dependency.

According to another embodiment of the present invention, a method for scheduling operations to perform on objects is provided. The method identifies a plurality of operations to perform on a plurality of objects each having at least one attribute. At least one of the operations has scheduling dependency on another operation. The method generates a numeric value for each of the objects from the at least one attribute of the object. The method schedules the operations to perform on the objects based on the numeric values of the objects and the scheduling dependency.

According to a further embodiment of the present invention, a computer system for scheduling operations to perform on objects is provided. The computer system comprises a memory having computer readable instructions and a processor configured to execute the computer readable instructions. The instructions comprise identifying a plurality of operations to perform on a plurality of objects each having at least one attribute. At least one of the operations has scheduling dependency on another operation. The instructions further comprise generating a numeric value for each of the objects from the at least one attribute of the object. The instructions further comprise scheduling the operations to perform on the objects based on the numeric values of the objects and the scheduling dependency.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Computer utilities that operate on files (e.g., a find utility for locating a file in a directory structure, a tar utility for converting a group of files into an archive, an rsync utility for synchronizing files and directories from one location to another, etc.) begin processing at the root directory and operate on the files in a certain predefined order such as a top-down order, a bottom-up order, a breadth-first order or a depth-first order. The order creates dependencies between the operations.

Most computer utilities operate on the files using a single thread such that the order of traversal resolves the dependencies between the operations. On a parallel file system, which is a type of clustered file system that spreads data across multiple storage nodes, it is desirable to perform the file operations in parallel. The dependencies between files establish an order on some of the operations and also determine the maximum degree of parallelism. File operations on the files that do not have dependencies may be scheduled in parallel, regardless of the files' locations in the directory structure. As each file operation completes, all other operations that depend upon the operation may be started. Furthermore, it is often desirable that operations with the same dependency be clustered to run on the same node to minimize conflicting updates to shared structures.

Given a list of files to be operated on, conventional systems sort the files by their pathnames. This sorting places the files with shorter pathnames first and clusters the files within the same directories together. However, sorting by the pathnames is generally slow as it involves sorting strings. Moreover, sorting based on pathnames does not account for all dependencies between the files, but accounts for only those dependencies that are inherent in the directory structure. Furthermore, sorting by the pathnames does not maximize the parallelism at all times.

Embodiments described herein are directed to methods, systems and computer program products that generate numeric values from pathnames of the files such that sorting by these numeric values account for all dependencies between the files and maximize the parallelism at all times. More specifically, the embodiments of the invention generate a numeric value for each of the files based on a first value that represents a depth of the pathname of the file and a second value that is a hash value of the pathname of the directory that contains the file.

Figure 1:
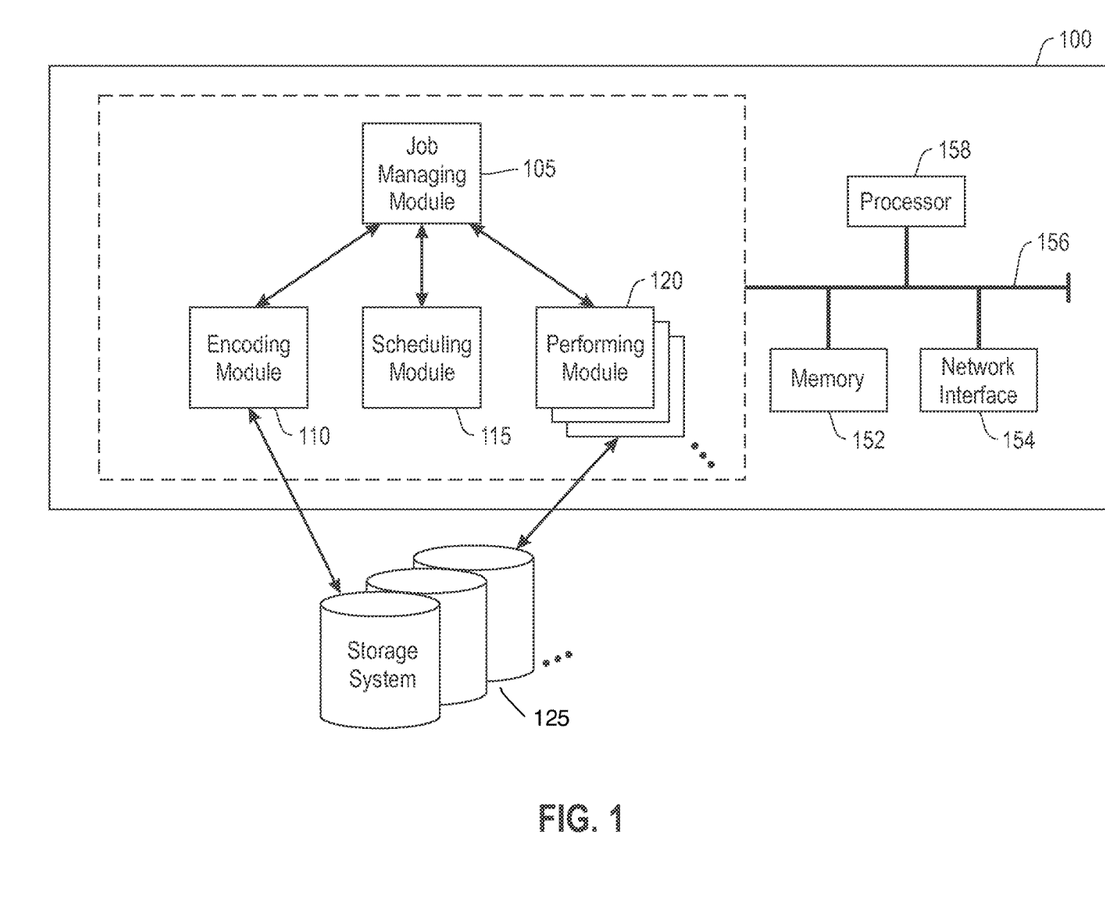
FIG. 1 depicts a system for scheduling the operations of a job to be performed on a plurality of objects in accordance with some embodiments of the invention.

FIG. 1 depicts a system 100 for scheduling operations of a job to be performed on a plurality of objects in accordance with some embodiments of the invention. The system 100 of some embodiments includes a job managing module 105, an encoding module 110, a scheduling module 115, and performing modules 120. FIG. 1 also illustrates a storage system 125.

The job managing module 105 manages a job to be performed on a plurality of objects each having a set of attributes (e.g., a name). In some embodiments, a job includes one or more operations to perform on the objects (e.g., files, database entries, etc.) and is initiated by a utility that is invoked by a user or another utility. Examples of a utility include a find utility for finding a file in a directory structure, a delete utility for deleting one or more files, a copy utility for copying one or more files from one directory to another, etc. In some embodiments, the job managing module 105 receives a list of objects on which to perform a job when the job is initiated. The job managing module 105 directs the encoding module 110 to encode one or more attributes of the objects into numeric values. The job managing module 105 directs the scheduling module 115 to schedule the operations of the job based on the numeric values. The job managing module 105 then distributes the scheduled operations to one or more of the performing modules 120 that perform the operations according to the schedule.

The encoding module 110 receives the list of objects from the job managing module 105 and encodes one or more attributes of the objects into numeric values. When the objects are files in a directory structure, the encoding module 110 computes a depth value of each file that represents a location of the file in the directory structure based on the pathname of the file. As known, a pathname of a file is a sequence of symbols and string that identifies a file. A pathname of a file includes a filename and names of the directories up to a root directory. A pathname of a particular directory includes only the names of the directories, including the name of the particular directory, up to a root directory. In some embodiments, a depth value of a file is an integer value.

The encoding module 110 also generates a hash value of the pathname of the directory that contains each file using a hash function. In some embodiments, the hash function takes as input the pathname of the directory that contains the file and generates an output hash value that is a floating point value greater than or equal to zero and less than one. The hash function outputs the same hash value for the same input pathname all the time.

In some embodiments, the encoding module 110 generates a numeric value for each file in the list of files based on the depth value and the hash value of the file. The numeric values for the files generated in this manner, therefore, are the same for all files in the same directory. Alternatively, in some embodiments, the numeric values for the files may represent operational dependencies between files in different directories having a common root directory in a directory structure because the integer digits of the numeric values indicate locations of the different directories in the directory structure. Details of the encoding module 110 of some embodiments will be described further below by reference to FIG. 2.

The scheduling module 115 receives the list of objects each associated with a numeric value and generates a operation schedule for the operations of a given job. The scheduling module 115 schedules the operations of the job to perform on the objects based on the numerical values associated with the objects in order to resolve the dependencies between the operations and to maximize the parallelism. For example, when the job is initiated by a copy utility to copy a parent directory having child directories from one storage system to another, the scheduling module 115 sorts the files in the parent and child directories by the numerical values. The scheduling module 115 then schedules the copy operations for the files with the smaller numerical values ahead of the copy operations for the files with the larger numerical values. The scheduling module 115 schedules the copy operations for the files with the same numerical values together such that these operations can be performed by a single performing module. As another example, when the job is initiated by a delete utility to delete a parent directory having child directories, the scheduling modules 115 sorts the files in the parent and child directories by the numerical values and schedules the delete operations for the files with the larger numerical values ahead of the delete operations for the files with the smaller numerical values. The scheduling module 115 schedules the delete operations for the files with the same numerical values together such that these operations can be performed by a single performing module.

In some embodiments, the performing modules 120 operate within the system 100. In other embodiments, although not depicted in FIG. 1 as such, some or all of the performing modules 120 may operate in systems (not shown) other than the system 100. In some embodiments, the performing modules 120 comprise a cluster of servers accessing a file system. The job managing module 105 distributes the operations to one or more performing module 120 based on the schedule generated by the scheduling module 115. In particular, the job managing module 105 assigns all operations to be performed on the objects having the same numerical values to a single performance module so that this performance module alone performs the operations on these objects. In this manner, the job managing module 105 elimimites of the overhead (e.g., passing a lock on a directory) associated with having two or more different performing modules to perform operations on the files in the same directory. The job managing module 105 also directs the performing modules 120 to perform the operations of the job as scheduled by the scheduling module 115.

The storage systems 125 store the objects. For instance, the storage systems 125 may be file systems that store files and control access to the stored files. In some embodiments, the storage systems 125 may be shared-disk file systems or distributed file systems. The storage systems 125 are communicatively connected to the system 100, e.g., via a Storage Area Network (SAN).

As used herein, the terms module and sub-module may refer to an application specific integrated circuit, an electronic circuit, a processor (shared, dedicated, or group) and memory that executes one or more software or firmware programs, or a combinational logic circuit in a server. For example, in an embodiment, the encoding module 110 may be communicatively connected (e.g., through a bus 156) to a memory 152 to store and retrieve attributes and numeric values while encoding one or more attributes into the numeric values, and to a network interface 154 to access or retrieve objects stored in the storage systems 125. The encoding module 110 may also use a processor 158 to perform its operations. In some embodiments, the sub-modules of the system 100, namely the encoding module 110, the scheduling module 115 and the performing modules 120 may be combined or further partitioned. Also, the sub-modules of the system 100 may be implemented in more than one server in a distributed fashion.

Figure 2:
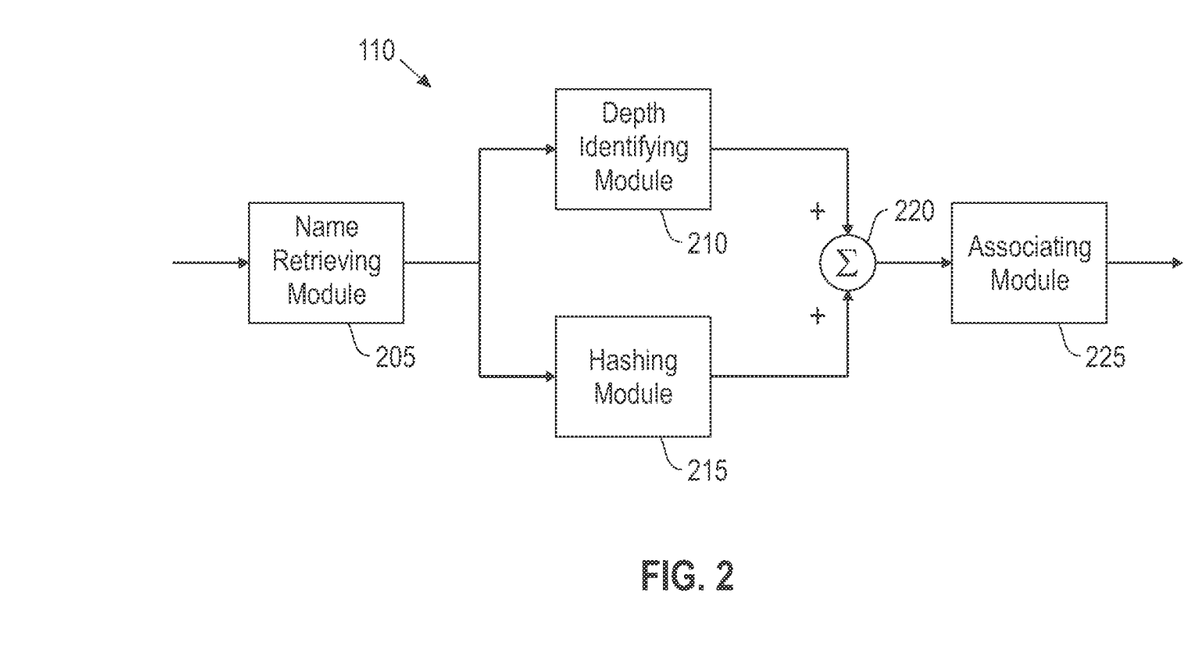
FIG. 2 depicts a block diagram of an encoding module in accordance with some embodiments of the invention.

FIG. 2 depicts a block diagram of the encoding module 110 of FIG. 1 in accordance with some embodiments of the invention. As shown, the encoding module 110 includes several sub-modules—an attribute retrieving module 205, a depth identifying module 210, a hashing module 215, an adder module 220, and an association module 225.

The attribute retrieving module 205 receives a list of objects from the job managing module 150 of FIG. 1. In some cases, the list of object is the list of names of the objects. In other cases, the list of objects is a list of other identifiers (e.g., inode numbers) of the objects. In such cases, the attribute retrieving module 205 accesses the storage system 125 to obtain the attributes of the objects using the identifiers. For each object, the attribute retrieving module 205 retrieves at least one attribute of the object and passes the retrieved attribute to the depth identifying module 210 and the hashing module 215.

The depth identifying module 210 identifies a depth of the attribute of a given object. For instance, when the given object is a file in a directory structure, the depth identifying module may implement the following pseudo-code to identify the depth of the file:

Depth(file_pathname)=Count_String_Matches(file_pathname, directory_separator)

where file_pathname is an input string representing the pathname of the file and directory_separator is a symbol or an alphanumeric character (e.g., forward-slash, backward slash, etc.) that is used by a storage system 125 to separate directory names. Count_String_Matches is a function that counts the number of occasions of the directory_separator in file_pathname. For example, if the input file_pathname for a file "randy1" is a string "/abc/tdir/randy1" and directory_separator is a forward slash "/", Count_String_Matches would return 3. As can be recognized, Depth(pathname), where pathname is the pathname of the directory that contains the file, would return the same depth value as Depth(file_pathname) does. That is, for example, if the input pathname is "/abc/tdir/", which is the pathname of the directory "tdir" that contains the file "randy1", Depth(pathname) also returns 3.

As such, depth values for objects may represent constraints in scheduling operations to be performed on the objects. For instance, the depth values may be used when processing all objects of a certain depth ahead of all objects with a greater depth, or vice versa. As an alternative to generating and utilizing depth values, some embodiments of the invention may generate and utilize other values that represent constrains in scheduling operations to be performed on the objects. For instance, priority values or importance values that specify logical dependency between objects (e.g., a first object must be created or destroyed before a second object) or preferential treatment for some objects over another objects (e.g., a first set of data packets get switched or routed ahead of a second set of data packets).

The hashing module 215 generates a hash value from the attribute of a given object. For instance, when the given object is a file in a directory structure, the hashing module 215 may implement the following pseudo-code to generate an output hash value:

Unit_Interval_Hash(Substring(file_pathname, 1, Length (file_pathname)−Length(File_Name(file_pathname))

where Unit_Interval_Hash is a hash function that takes as input a string and outputs a quasi-random floating point value greater than or equal to zero and less than one in some embodiments. For a given string input, Unit_Interval_Hash is designed to return the same floating point value. In some embodiments, the Uniti_Interval_Hash is implemented using a hash function that returns an integer value from 0 up to an integer N (i.e., an integer number from 0 to N−1). The output of this hash function is divided by N to give a floating point value greater than or equal to zero and less than one. Substring is a function that returns a substring of an input string. The first argument to Substring is the pathname of the file, the second argument to Substring is the starting index of the output substring of the pathname, and the third argument to Substring is the ending index of the output substring of the pathname, which in this case is the length of the directory names of the file. For example, when the input pathname is "/abc/tdir/randy1", the Length(file_pathname)−Length (File_ Name(file_pathname)) would return the length of substring "/abc/tdir/". Length is a function that returns a length of an input string. File_Name is a function that returns a filename included in an input pathname. Such hash values for objects may represent equivalencies in scheduling operations to be performed on the objects. For instance, objects with the same hash value may be put in the same group for processing the objects together.

The adder module 220 adds the depth value of an object and the hash value of the input object to generate an output numeric value for the object. The following show some example input objects and the resulting numeric values:

(1) Pathname: /abc/tdir/randy1
Numeric value: +3.49449638091027E+000
(2) Pathname: /abc/tdir/ax
Numeric value:+3.49449638091027E+000
(3) Pathname: /abc/tdir/mmPolicy.8368.765871DF/mm_tmp/PWL.12
Numeric value: +5.21282524359412E+000
(4) Pathname: /abc/tdir/mmPolicy.31559.1E018912/mm_tmp/PWL.3
Numeric value: +5.10672733094543E+000
(5) Pathname: /abc/tdir/mmPolicy.31559.1E018912/mm_tmp/PWL.2
Numeric value: +5.10672733094543E+000

The examples (4) and (5) show that the files PWL.3 and PWL.2 have the same numeric values +5.10672733094543E+000 because these two files are in the same directory "/abc/tdir/mmPolicy.31559.1E018912/mm_tmp/". The examples (3) and (4) show that the numeric values generated for the files PWL.12 and PWL.3 are different because the two directories "/abc/tdir/mmPolicy.8368.765871DF/mm_tmp" and "/abc/tdir/mmPolicy.31559.1E018912/mm_tmp/" are different. However, the integer digits for both numeric values are 5's. The operations to perform on these two files may be scheduled for being performed in parallel because the operations would not have dependencies between them. All five examples (1)-(5) have a common root folder "/abc/".

The association module 225 associates the output numeric value from the adder module 220 with the input object. In some embodiments, this association involves in accessing the storage system to augment the metadata for the object with the numeric value calculated.

Figure 3:
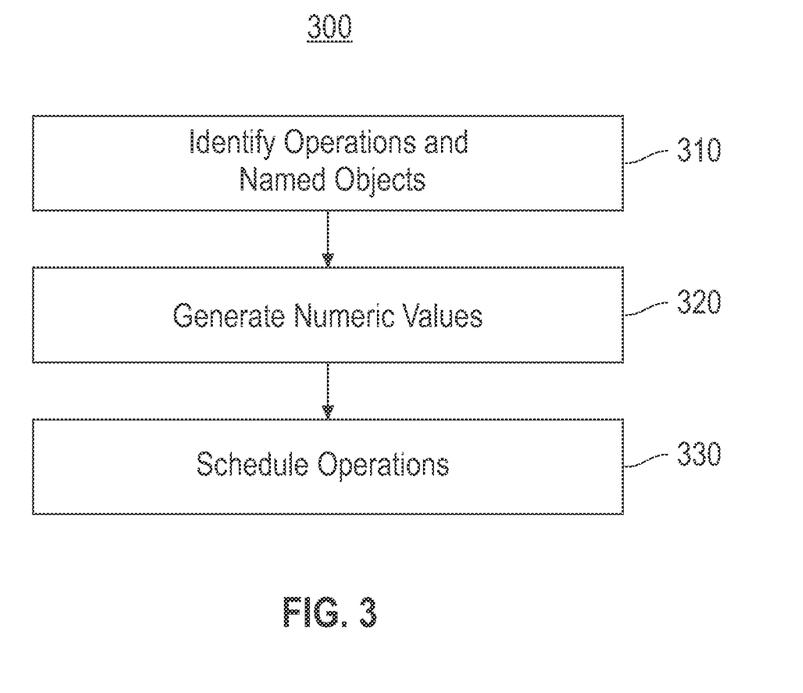
FIG. 3 depicts a process flow for efficiently performing the operations of a job in accordance with some embodiments of the invention.

FIG. 3 depicts a process flow for scheduling the operations of a job in accordance with some embodiments of the invention. In some embodiments, the system 100 performs the process flow shown in FIG. 3. At block 310, the system 100 identifies a plurality of operations to perform on a plurality of objects that each has at least one attribute. In some embodiments, the plurality of operations as well as the plurality of objects are defined by an invoked job. For instance, when a recursive copy utility is invoked to copy a parent directory having child directories, the plurality of objects are all the files in the parent directory and the child directories and the plurality of operations are a copy operation performed on each of these files.

At block 320, the system 100 generates a numeric value for each of the objects identified at block 310. The system 100 generates a depth value from the attribute of the object and generates a hash value from the attribute of the object using a hash function. The hash function outputs a same hash value for a same input attribute. The system 100 adds the depth value and the hash value to generate the numeric value for the object. In some embodiments, the depth value is an integer value, and the hash value is a floating point value greater than or equal to zero and less than one. The depth value represents a location of the object within a hierarchical structure. For instance, when the object is a file, the depth value of the file represents a location of the file in a directory structure.

At block 330, the system 100 schedules the operations of the job based on the numeric values generated at the block 320. In particular, the system 100 identifies a set of objects having the same numeric values and assigns a set of operations to be performed on the identified set of objects to a particular computer so that the particular computer alone performs the set of operations on the identified set of objects. In some embodiments, the system 100 sorts the objects by the numerical values of the objects. The system 100 schedules a first operation to be performed on a first object having a first numerical value ahead of a second operation to be performed on a second object having a second numerical value that is larger than the first numerical value if the scheduling dependency indicates that the first operation requires completion of the second operation. Also, the system 100 schedules the second operation ahead of the first operation if the scheduling dependency indicates that the second operation requires completion of the first operation.

The various embodiments of the invention have been described in the context of encoding the attribute of objects (e.g., filenames and pathnames). However, it is to be noted that the embodiments of the invention are also applicable for encoding any other attributes of the objects. For instance, ownership (e.g., group or individual) information, permission information (e.g., read, write, execute permissions), timestamps, group identifiers, fileset identifiers, user identiers, etc. of the objects may be encoded in some embodiments of the invention. These other attributes encoded into the numerical values for the objects would allow for efficiently performing operations such as "process all files of user A before those of user B" and "process all files for user A in one batch and those for user B in another batch."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for accelerating processor scheduling operations performed on objects in a parallel processing system, the computer program product comprising:
   a computer readable storage medium having program instructions embodied therewith, the program instructions readable by the parallel processing system to cause the parallel processing system to perform a method comprising:
      identifying, by the parallel processing system, a plurality of operations to perform on a plurality of objects, wherein each of the plurality of objects is associated with a respective file pathname and wherein at least one of the operations has a scheduling dependency on another operation;
      generating, by the parallel processing system, a respective numeric value for each of the plurality of objects by at least:
         generating a respective depth value of the respective file pathname for each of the plurality of objects;
         generating a respective hash value of the respective file pathname for each of the plurality of objects using a hash function; and
         generating the respective numeric value for each of the plurality of objects by adding together the respective depth value and the respective hash value for each of the plurality of objects;
      augmenting, by the parallel processing system, respective metadata of each of the plurality of objects using the respective numeric value;
      scheduling, by the parallel processing system, the operations to perform on the objects based on the respective numeric values of the plurality of objects and the scheduling dependency, wherein the plurality of objects are sorted based on the respective numeric value associated with the respective object of the plurality of objects; and
      wherein the scheduling and sorting increase processing speed of the file based operations on the parallel processing system by minimizing conflicting updates to shared structures.

2. The computer program product of claim 1, wherein the respective depth value is an integer value, and the respective hash value is a floating point value greater than or equal to zero and less than one.

3. The computer program product of claim 1, wherein the respective depth value represents a location of a respective object of the plurality of objects within a hierarchical structure.

4. The computer program product of claim 1, wherein the scheduling the operations to perform on the objects comprises:
   identifying a set of objects from the plurality of objects having a same respective numeric value; and
   assigning a set of operations to be performed on the identified set of objects to a particular computer so that the particular computer alone performs the set of operations on the identified set of objects.

5. The computer program product of claim 1, wherein the scheduling the operations to perform on the objects comprises:
   sorting the plurality of objects by the respective numerical value of each of the plurality of objects;
   scheduling a first operation to be performed on a first object having a first numerical value ahead of a second operation to be performed on a second object having a second numerical value that is larger than the first numerical value if the scheduling dependency indicates that the first operation requires completion of the second operation; and scheduling the second operation ahead of the first operation if the scheduling dependency indicates that the second operation requires completion of the first operation.

6. A computer-implemented method for scheduling operations to perform on objects in a parallel processing system, comprising:

identifying, by the parallel processing system, a plurality of operations to perform on a plurality of objects, wherein each of the plurality of objects is associated with a respective file pathname at least one of the operations has a scheduling dependency on another operation;

generating, by the parallel processing system, a respective numeric value for each of the plurality of objects by at least:

generating a respective depth value of the respective file pathname for each of the plurality of objects;

generating a respective hash value of the respective file pathname for each of the plurality of objects using a hash function; and generating the respective numeric value for each of the plurality of objects by adding together the respective depth value and the respective hash value for each of the plurality of objects;

augmenting, by the parallel processing system, respective metadata of each of the plurality of objects using the respective numeric value;

scheduling, by the parallel processing system, the operations to perform on the objects based on the respective numeric values of the plurality of objects and the scheduling dependency, wherein the plurality of objects are sorted based on the respective numeric value associated with the respective object of the plurality of objects; and wherein the scheduling and sorting increase processing speed of the file based operations on the parallel processing system by minimizing conflicting updates to shared structures.

7. The method of claim 6, wherein the respective depth value is an integer value, and the respective hash value is a floating point value greater than or equal to zero and less than one.

8. The method of claim 6, wherein the respective depth value represents a location of a respective object of the plurality of objects within a hierarchical structure.

9. The method of claim 6, wherein the scheduling the operations to perform on the objects comprises:

identifying a set of objects from the plurality of objects having a same respective numeric value; and assigning a set of operations to be performed on the identified set of objects to a particular computer so that the particular computer alone performs the set of operations on the identified set of objects.

10. The method of claim 6, wherein the scheduling the operations to perform on the objects comprises:

sorting the plurality of objects by the respective numerical value of each of the plurality of objects;

scheduling a first operation to be performed on a first object having a first numerical value ahead of a second operation to be performed on a second object having a second numerical value that is larger than the first numerical value if the scheduling dependency indicates that the first operation requires completion of the second operation; and scheduling the second operation ahead of the first operation if the scheduling dependency indicates that the second operation requires completion of the first operation.

11. A parallel processing computer system for scheduling operations to perform on objects comprising:

a memory having computer readable instructions; and a processor configured to execute the computer readable instructions, the instructions comprising:

identifying a plurality of operations to perform on a plurality of objects, wherein each of the plurality of objects is associated with a respective file pathname and wherein at least one of the operations has a scheduling dependency on another operation;

generating a respective numeric value for each of the plurality of objects by at least:

generating a respective depth value of the respective file pathname for each of the plurality of objects;

generating a respective hash value of the respective file pathname for each of the plurality of objects using a hash function; and generating the respective numeric value for each of the plurality of objects by adding together the respective depth value and the respective hash value for each of the plurality of objects;

augmenting respective metadata of each of the plurality of objects using the respective numeric value;

scheduling the operations to perform on the objects based on the respective numeric values of the plurality of objects and the scheduling dependency, wherein the plurality of objects are sorted based on the respective numeric value associated with the respective object of the plurality of objects; and wherein the scheduling and sorting increase processing speed of the file based operations on the parallel processing system by minimizing conflicting updates to shared structures.

12. The computer system of claim 11, wherein the respective depth value is an integer value, and the respective hash value is a floating point value greater than or equal to zero and less than one.

13. The computer system of claim 11, wherein the respective depth value represents a location of a respective object of the plurality of objects within a hierarchical structure.

14. The computer system of claim 11, wherein the scheduling the operations to perform on the objects comprises:

identifying a set of objects from the plurality of objects having a same numeric value; and assigning a set of operations to be performed on the identified set of objects to a particular computer so that the particular computer alone performs the set of operations on the identified set of objects.

15. The computer system of claim 11, wherein the scheduling the operations to perform on the objects comprises:

sorting the plurality of objects by the respective numerical value of each of the plurality of objects;

scheduling a first operation to be performed on a first object having a first numerical value ahead of a second operation to be performed on a second object having a second numerical value that is larger than the first numerical value if the scheduling dependency indicates that the first operation requires completion of the second operation; and scheduling the second operation ahead of the first operation if the scheduling dependency indicates that the second operation requires completion of the first operation.

\* \* \* \* \*